Jan. 26, 1971  H. W. VOORHIS  3,557,528
CLOSING MACHINE FOR EGG CARTONS OR THE LIKE
Filed July 15, 1968  7 Sheets-Sheet 1

INVENTOR
HAROLD W. VOORHIS
BY
Mason, Porter, Diller & Brown
ATTORNEY

Jan. 26, 1971 H. W. VOORHIS 3,557,528
CLOSING MACHINE FOR EGG CARTONS OR THE LIKE
Filed July 15, 1968 7 Sheets-Sheet 3

INVENTOR
HAROLD W. VOORHIS
BY
Mason, Porter, Diller & Brown
ATTORNEY

Jan. 26, 1971 H. W. VOORHIS 3,557,528
CLOSING MACHINE FOR EGG CARTONS OR THE LIKE
Filed July 15, 1968 7 Sheets-Sheet 4

INVENTOR
HAROLD W. VOORHIS
BY
Mason, Porter, Diller & Brown
ATTORNEY

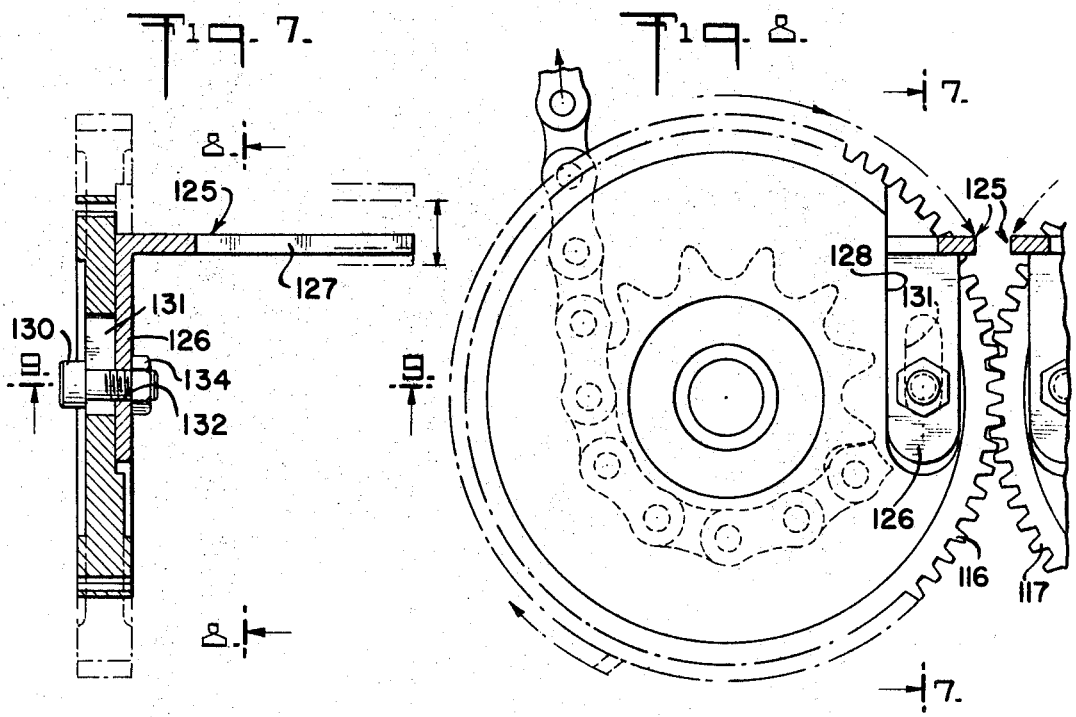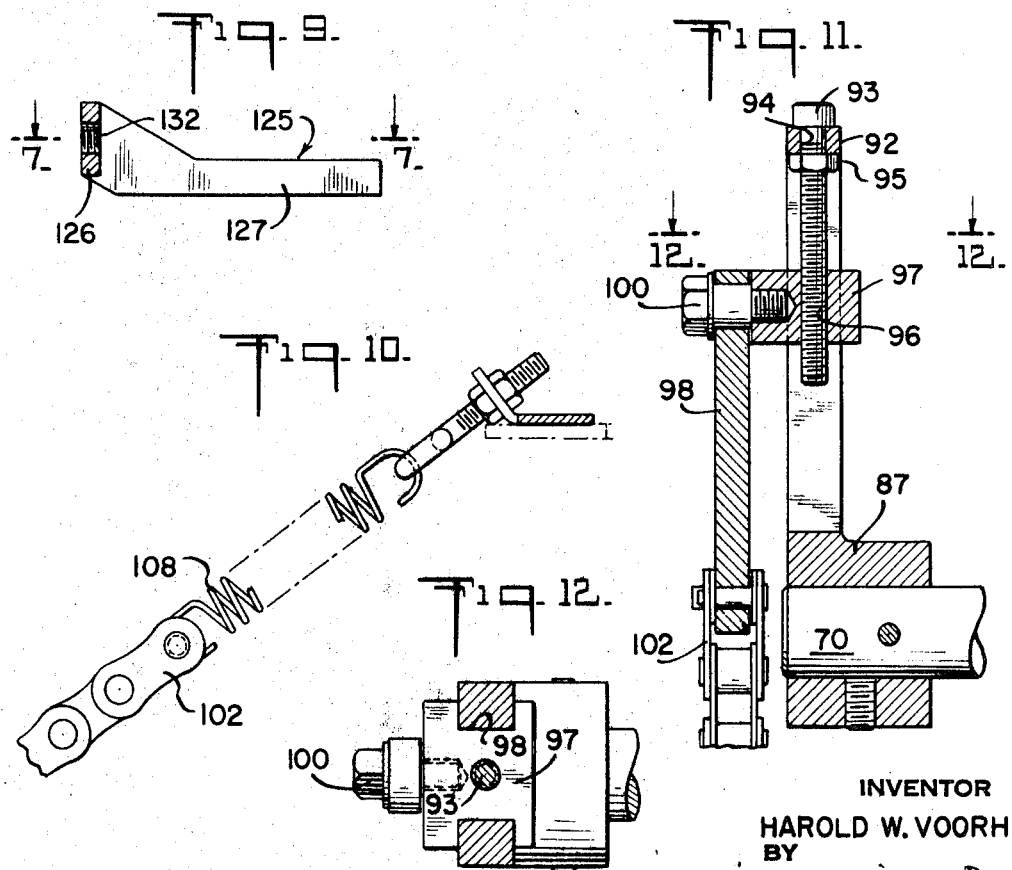

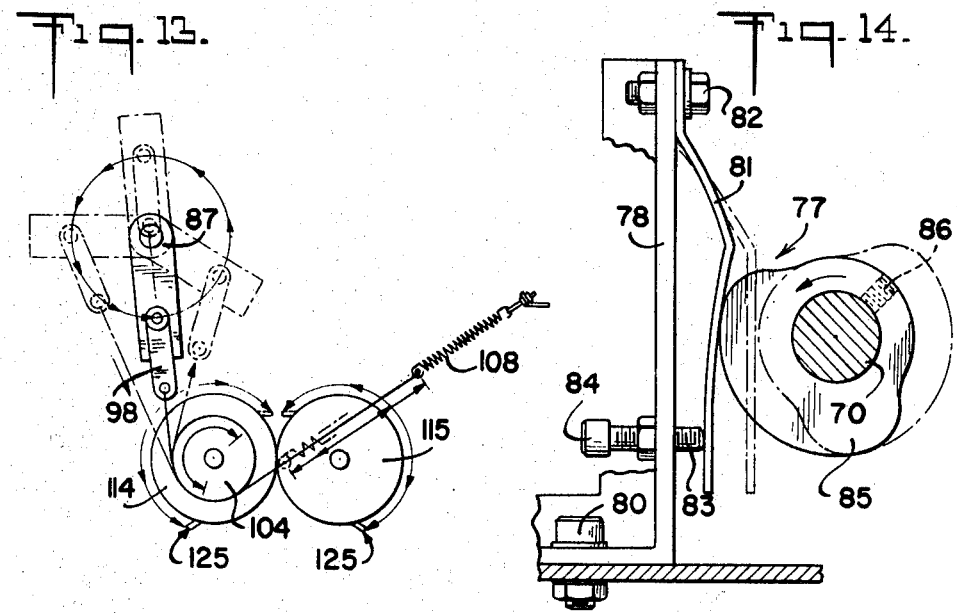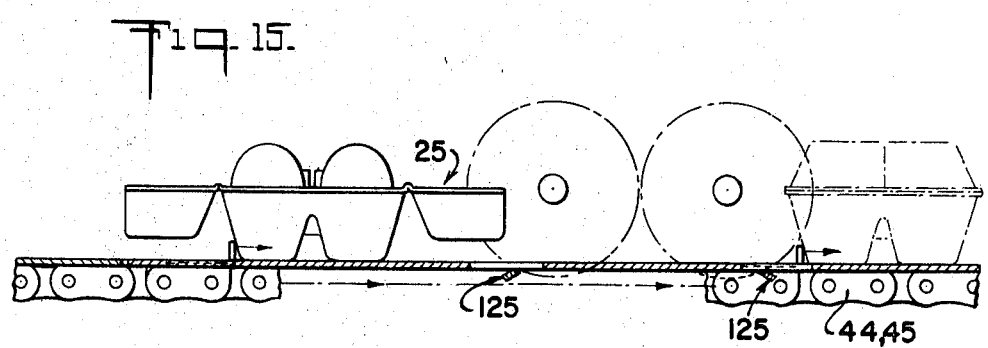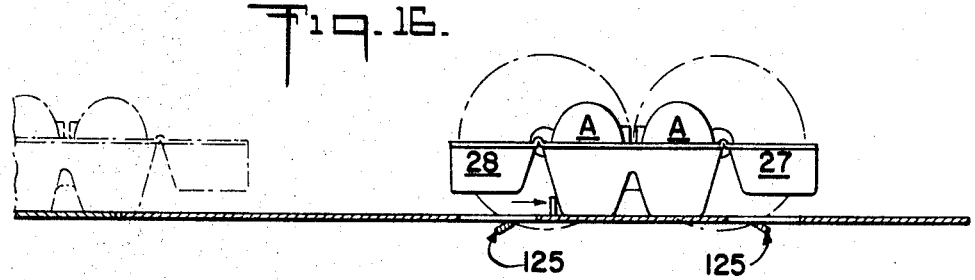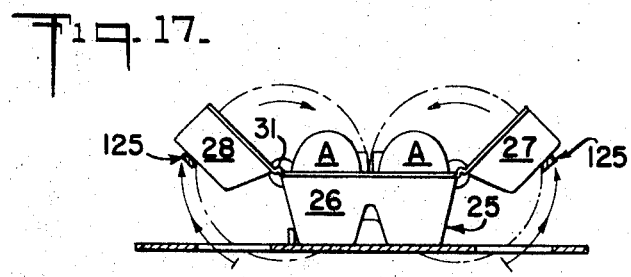

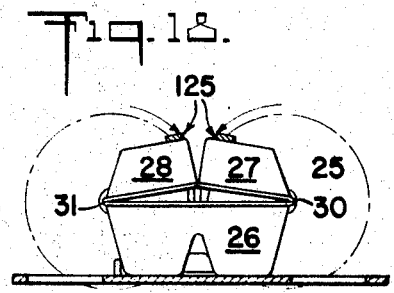
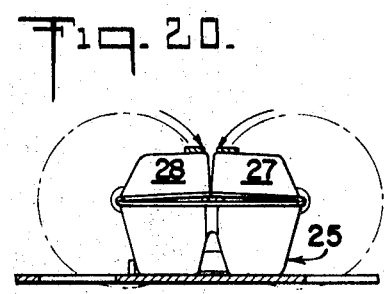
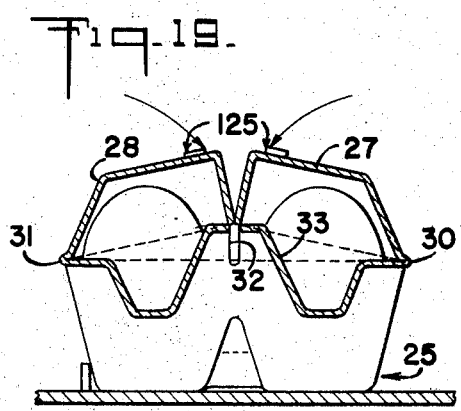
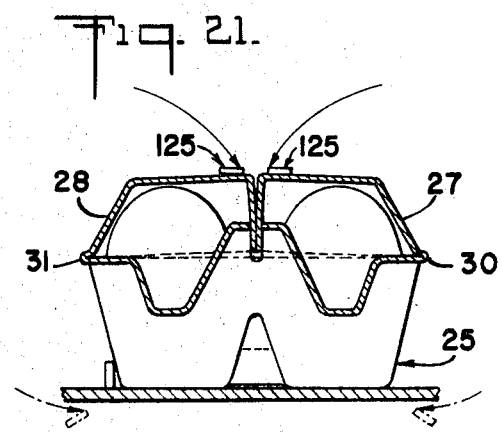
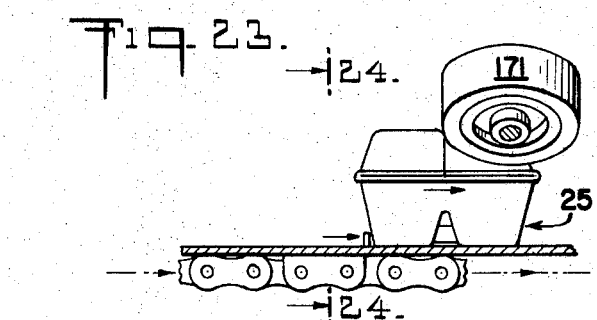
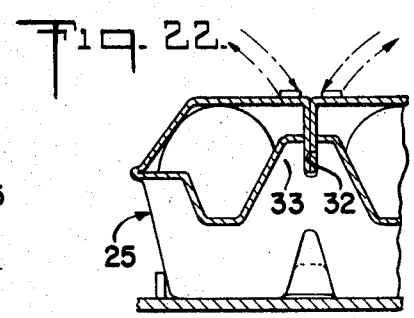
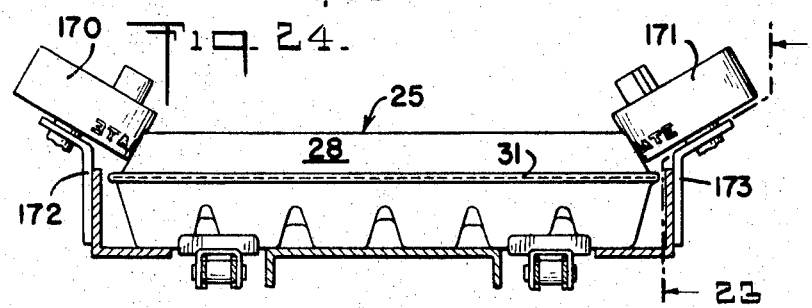
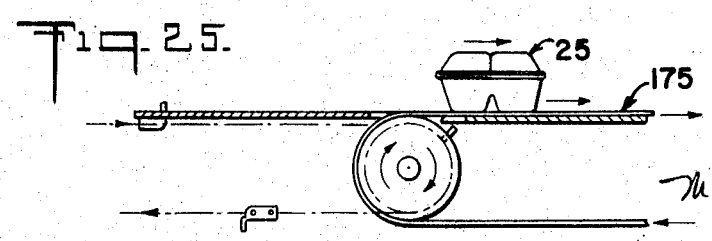

United States Patent Office 3,557,528
Patented Jan. 26, 1971

3,557,528
CLOSING MACHINE FOR EGG CARTONS OR THE LIKE
Harold W. Voorhis, Upper Nyack, N.Y., assignor to Continental Can Company, Inc., New York, N.Y., a corporation of New York
Filed July 15, 1968, Ser. No. 744,713
Int. Cl. B65b 7/26
U.S. Cl. 53—377                                23 Claims

ABSTRACT OF THE DISCLOSURE

This disclosure is directed to a machine for closing egg cartons or the like, and includes a pair of folding members carried by meshed gears whereupon rotation of the gears moves the folding members along arcuate paths from a position beneath an end portion of each cover to a second position thereabove whereby during the arcuate movement of the folding members the latter initially contact and progressively fold the covers about associated hinge lines to a final position in complete overlying relationship to a body of an associated carton. Crank arms are provided for imparting movement to the folding members, and adjusting means are associated with the crank arms for adjusting the length of travel of the closing members for closing cartons of varying overall heights. Adjustment means are also provided for adapting the machine to close cartons of varying cover widths.

A primary object of this invention is to provide a novel carton closing machine of the type particularly adapted to close egg cartons of the type in which a pair of covers are joined along hinge lines to a body of the carton, the machine including two pairs of arcuately movable folding members normally disposed at opposite longitudinal ends of the carton, and means for moving the folding members of each pair in opposite arcuate directions whereupon the folding members initially contact an end portion of each cover outboard of the hinge lines thereof and progressively fold the covers about the hinge lines to a final position in complete overlying relationship to the carton body.

A further object of this invention is to provide a novel carton closing machine of the type heretofore described wherein the folding members are carried by meshed gears, and a rotatable crank arm is coupled to the gears to impart oscillatory rotational movement thereto for moving the folding members between opposite ends of the arcuate paths thereof.

Still a further object of this invention is to provide a novel carton closing machine of the type heretofore described wherein the crank arm means includes adjusting means for varying the length of travel of the folding members along the paths thereof, and adjusting means are further provided for altering the initial position of each of the folding members in accordance with the width of covers which are to be closed by the machine.

With the above and other objects in view that will hereinafter appear, the nature of the invention will be more clearly understood by reference to the following detailed description, the appended claimed subject matter, and the several views illustrated in the accompanying drawings.

In the drawings:

FIG. 7 is a sectional view taken generally along line 7—7 of FIG. 8, and illustrates means for adjusting one of the folding members relative to its associated gear.

FIG. 8 is a sectional view taken generally along line 8—8 of FIG. 7, and more clearly illustrates the manner in which the folding members is slidably adjustably carried by its associated gear.

FIG. 9 is a sectional view taken generally along line 9—9 of FIG. 7, and more clearly illustrates the configuration of the folding member.

FIG. 10 is an enlarged fragmentary view of a detail of the closing machine, and illustrates one of a pair of tension springs adjustably secured to an associated drive chain for imparting the return motion to each of the folding members.

FIG. 11 is a sectional view taken through the crank arm of FIG. 2 when the latter is positioned at the top of its stroke, and illustrates means for adjusting the throw of the crank arm.

FIG. 12 is a sectional view taken generally along line 12—12 of FIG. 11, and illustrates a slidably mounted block connecting a pivot link to an end of the chain opposite that illustrated in FIG. 10 of the drawings.

FIG. 13 is a highly schematic view of the crank arm, gears, chain and spring illustrated in FIG. 2, and illustrates the manner in which reciprocal arcuate motion is imparted to the two mesh gears and the folding members carried thereby.

FIG. 14 is an enlarged sectional view taken generally along line 14—14 of FIG. 1, and illustrates an adjustable brake for preventing the coasting of a cam shaft of the closing machine.

FIG. 15 is a highly schematic view of a conveyor mechanism of the closing machine, and illustrates the manner in which an open carton is advanced to a position at which the covers are above and in alignment with the folding members.

FIG. 16 is a highly schematic enlarged sectional view taken along line 16—16 of FIG. 3, and illustrates the position of the carton prior to and during a closing cycle of the machine.

FIGS. 17 through 22 illustrate the carton in end elevation and transverse section during the movement of the folding members, and illustrates the manner in which the folding members progressively fold the covers into complete overlying relationship to the carton body, and the eventual retracting paths followed by the folding members to the original positions thereof illustrated in FIGS. 15 and 16.

FIG. 23 is a sectional view taken generally along line 23—23 of FIG. 24, and illustrates a printing roll for applying indicia to an end panel of one or both of the carton covers after the latter have been closed.

FIG. 24 is a sectional view taken generally along line 24—24 of FIG. 23, and more clearly illustrates a printing roll associated with both ends of the closed carton.

FIG. 25 is a highly schematic view of a discharge end of the closing machine, and illustrates the closed and printed carton being removed from the closing machine by a take-away conveyor.

Figure 1:
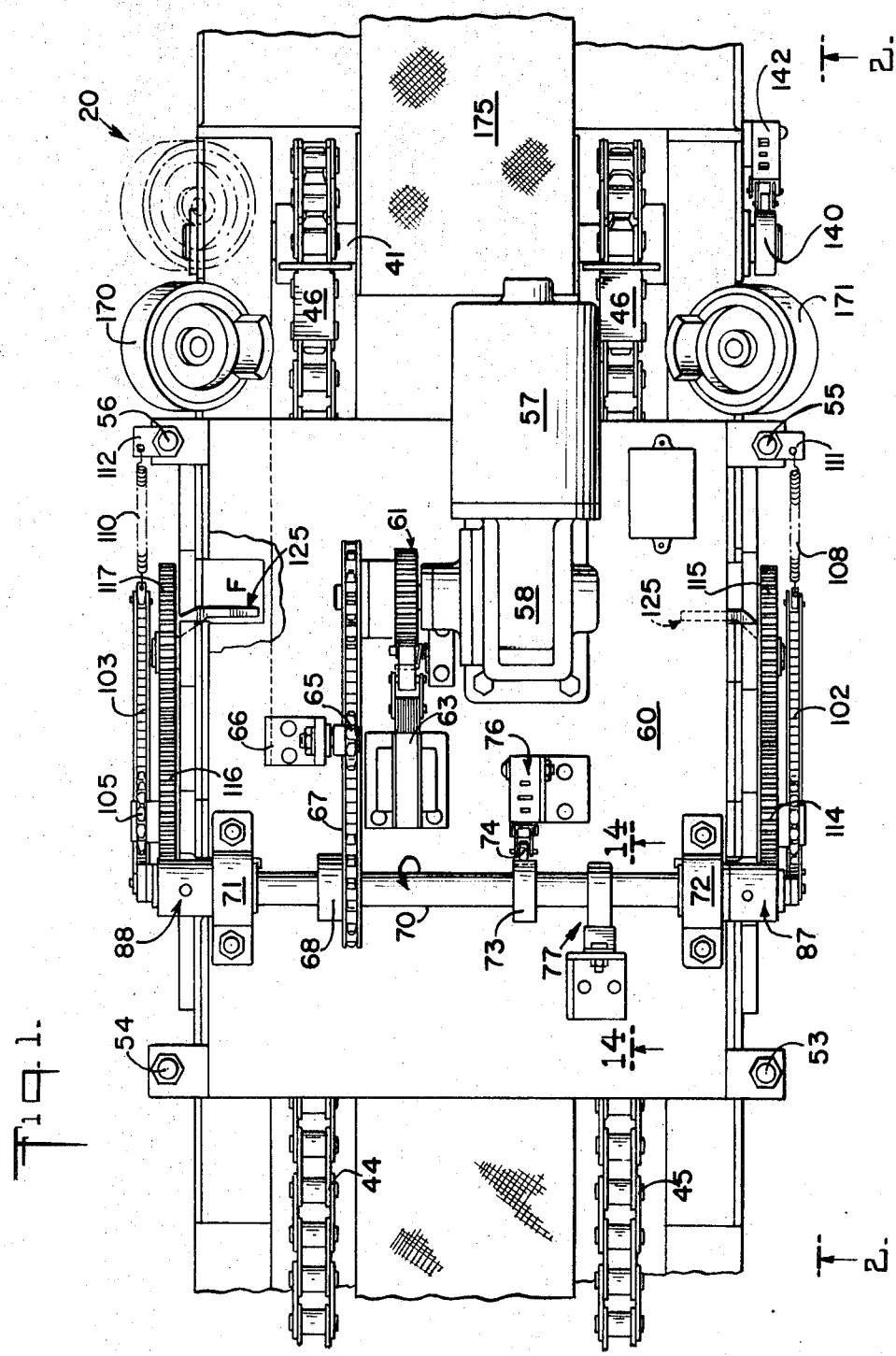
FIG. 1 is a fragmentary top plan view of a novel carton closing machine constructed in accordance with this invention, and illustrates a main drive for imparting arcuate motion to four folding members, each of which is carried by a rotatable gear.

A novel closing machine constructed in accordance with this invention is best illustrated in FIGS. 1 through 3 and 5 of the drawings, and is generally designated by the reference numeral 20. The closing machine 20 is particularly adapted for closing a carton 25 (FIG. 6) which is of a relatively conventional construction and includes a carton body 26 having opposite sides (unnumbered) to which are joined covers 27, 28 along respective fold lines 30, 31. Articles A, such as eggs or the like are individually received in pockets (unnumbered) of the carton body 26. The closing machine 20 is adapted to fold the covers 27, 28 from the position shown in FIG. 6 to a position at which respective edges (unnumbered) of the covers 27, 28 are received within and interlocked with slots 32 formed in upwardly directed protuberances 33 positioned along the center line of the carton body 26.

The closing machine 20 includes a frame 35 of a generally conventional construction including a pair of side plates 36, 37 at upper ends of which are carried respective L-shaped angle bars 38, 39. A shaft 41 (FIG. 2) is journalled between the plates 36, 37 and carries a pair of sprockets 42, 43 about which are entrained respective chains 44, 45. The opposite end portions of the chains 44, 45 are similarly entrained about sprockets (not shown) of a drive shaft (also not shown) which is conventionally driven to impart left-to-right movement to the upper run (unnumbered) of the chains 44, 45 in the direction of the unnumbered headed arrow in FIG. 2. A plurality of pusher members 46 carried by the chains 44, 45 thereby impart left-to-right motion to each of the cartons 25 to position each carton adjacent a closing mechanism 50 which will be described in detail immediately hereafter.

Figure 4:
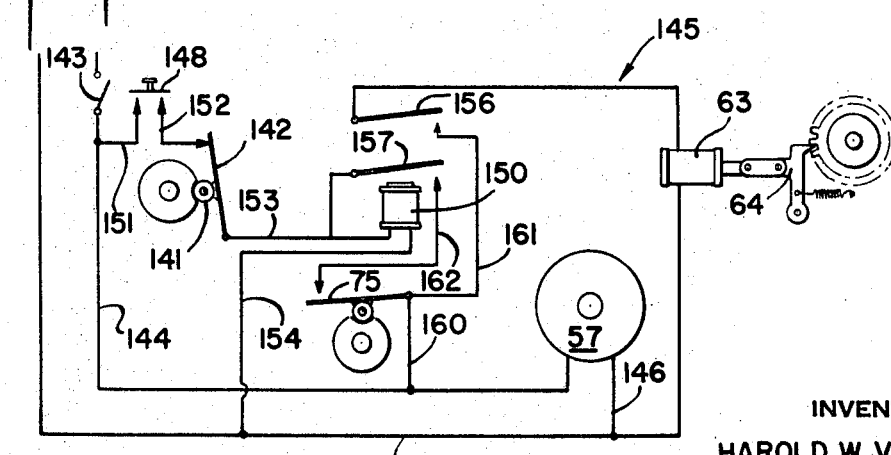
FIG. 4 is a diagrammatic view of the control circuit for the closing machine, and illustrates the system just prior to beginning of a folding cycle.
Figure 5:
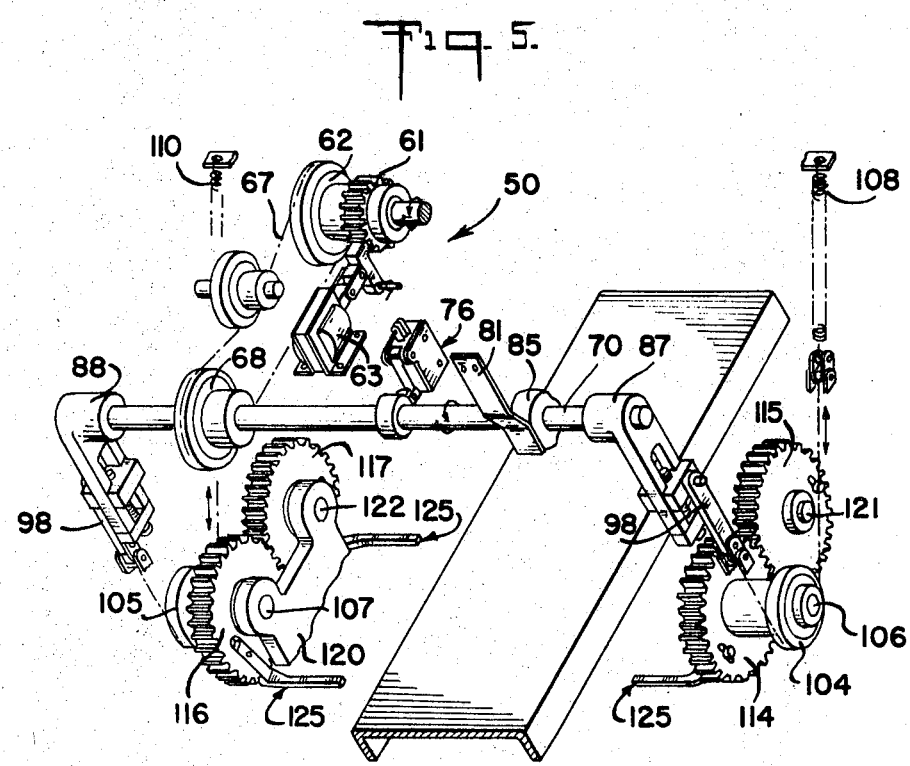
FIG. 5 is a fragmentary perspective view of the various drive mechanisms of the closing machine, and illustrates a crank arm associated with one of each of the two pairs of second gears for imparting reciprocal arcuate movement to the folding members.

The carton closing mechanism 50 of the closing machine 20 includes a frame 51 for supporting drive means 52. The frame 51 is supported above the upper run of the chains 44, 45 by a plurality of bolts 53 through 56 (FIG. 1) in a manner readily apparent from FIGS. 1 through 3 of the drawings. A motor 57 and a right-angle drive 58 are conventionally bolted or otherwise secured to an upper plate 60 of the frame 51. An output shaft (unnumbered) of the right-angle drive 58 is connected through a clutch 61 to a drive sprocket 62 (FIG. 5). A solenoid 63 (FIGS. 1 and 4) operates a spring-biased pivotally mounted finger 64 for selectively operating the clutch 61 to impart rotation to the sprocket 62 from the continuously rotating shaft (unnumbered) of the right-angle drive 58, as will be more apparent hereafter.

An idler sprocket 65 is conventionally carried by a bracket 66 secured to the plate 60, and functions to maintain a chain 67 under proper tension, the chain 67 being entrained about the sprocket 62 and a sprocket 68 fixed to a shaft 70 having opposite ends rotatably received in conventional journals 71, 72 secured to the plate 60. A cam 73 is also fixed to the shaft 70 and operates through a cam follower 74 to actuate a switch arm 75 of a switch 76 to control each cycle of the closing mechanism 50, as will be more apparent hereafter.

A brake mechanism 77 (FIGS. 1 and 14) is provided for preventing the shaft 70 from coasting when the clutch 61 is released. The brake mechanism 77 includes a bracket 78 fixed at its lower end to the plate 60 by a nut and bolt 80. A spring finger 81 is fixed at one end portion to the bracket 78 by a nut and bolt 82 while an opposite end portion (unnumbered) of the finger 81 is in alignment for contact with a projecting end portion 83 of a bolt 84 adjustably threaded through the bracket 78. A cam 85 is fixed to the shaft 70 by a screw 86 and is in alignment for contact with the spring finger 81, as is best illustrated in FIGS. 1 and 14 of the drawings. While the brake mechanism 77 will be described in more detail hereinafter, it will be noted from FIG. 14 that during the rotation of the shaft 70 and the cam 85 in a counter-clockwise direction as indicated by the unnumbered headed arrow in this figure the cam 85 and the finger 81 move from the phantom outline position to the solid line position to increase the friction between the cam and the spring finger thereby frictionally breaking the rotation of the shaft 70 in the counter-clockwise direction.

Crank arms 87, 88 (FIGS. 1 and 5) are fixed to end portions (unnumbered) of the shaft 70 projecting respectively beyond the journals 71, 72. The crank arms 87, 88 are identical and each includes a bifurcated portion defined by a pair of legs 90, 91 to opposite ends (unnumbered) of which is secured a cross bar 92 (FIG. 11). A bolt 93 is threadably received in a threaded bore 94 of each cross bar 92 and is locked in a selected position of adjustment by a locking nut 95. An opposite threaded end portion of each bolt 93 is received in a threaded aperture 96 of a block 97 having oppositely opening channels 98 (FIG. 12) embracing the legs 90, 91 of each crank arm 87, 88. The block 97 is of a generally H-shaped configuration (FIG. 12), and upon rotation of the screw 93 relative thereto the block 97 is selectively advanced toward or away from the axis of the shaft 70 to vary the throw of the respective crank arms 87, 88 to vary the closing forces imparted to the cartons 25 during a closing cycle of the machine 20, as will be more apparent hereafter.

Figure 2:
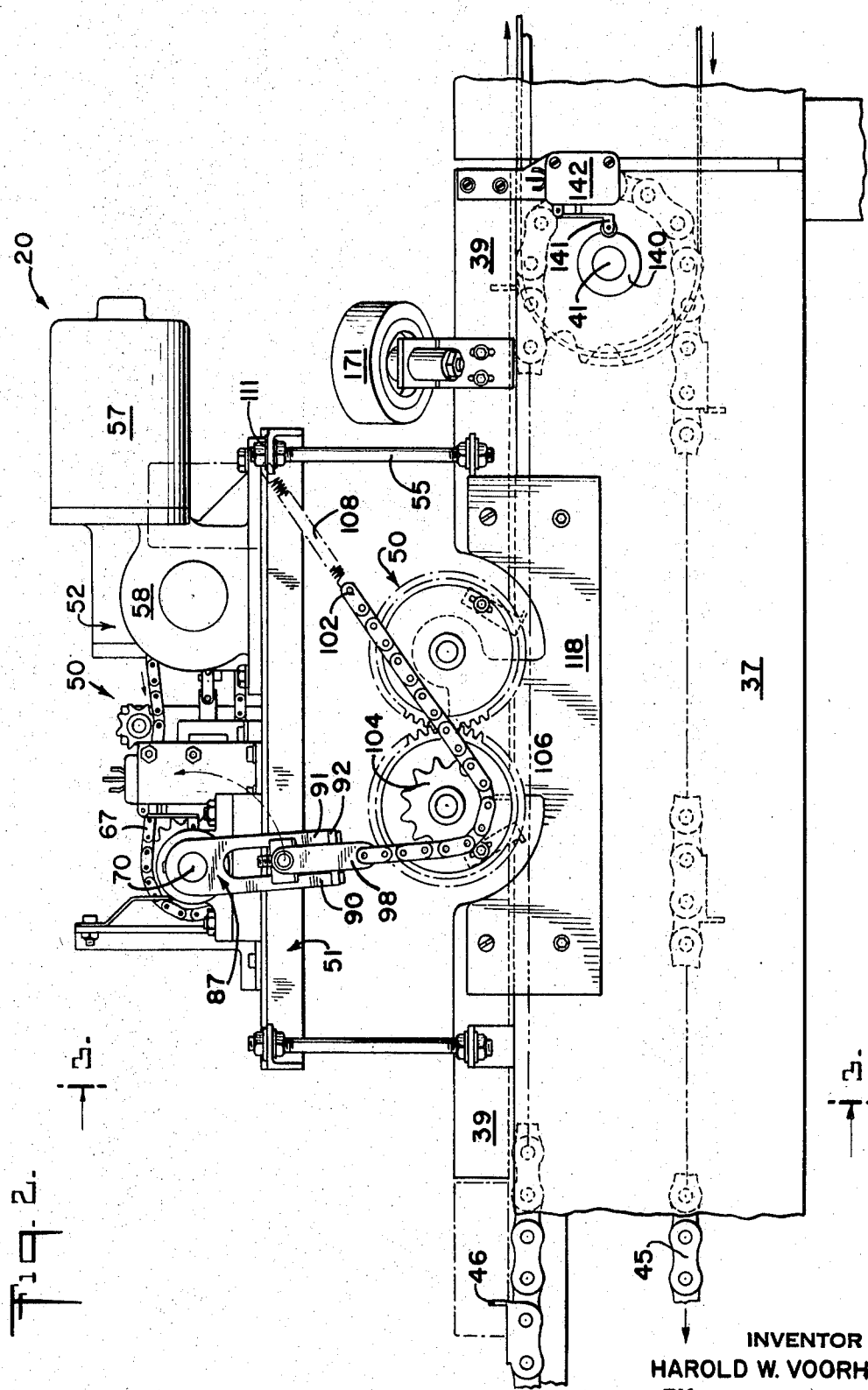
FIG. 2 is a side elevational view of the machine of FIG. 1 taken generally along line 2—2 of the latter Figure, and illustrates a crank arm connected by a chain to a sprocket of one of the gears for imparting oscillatory arcuate movement thereto and to a gear in mesh therewith.
Figure 3:
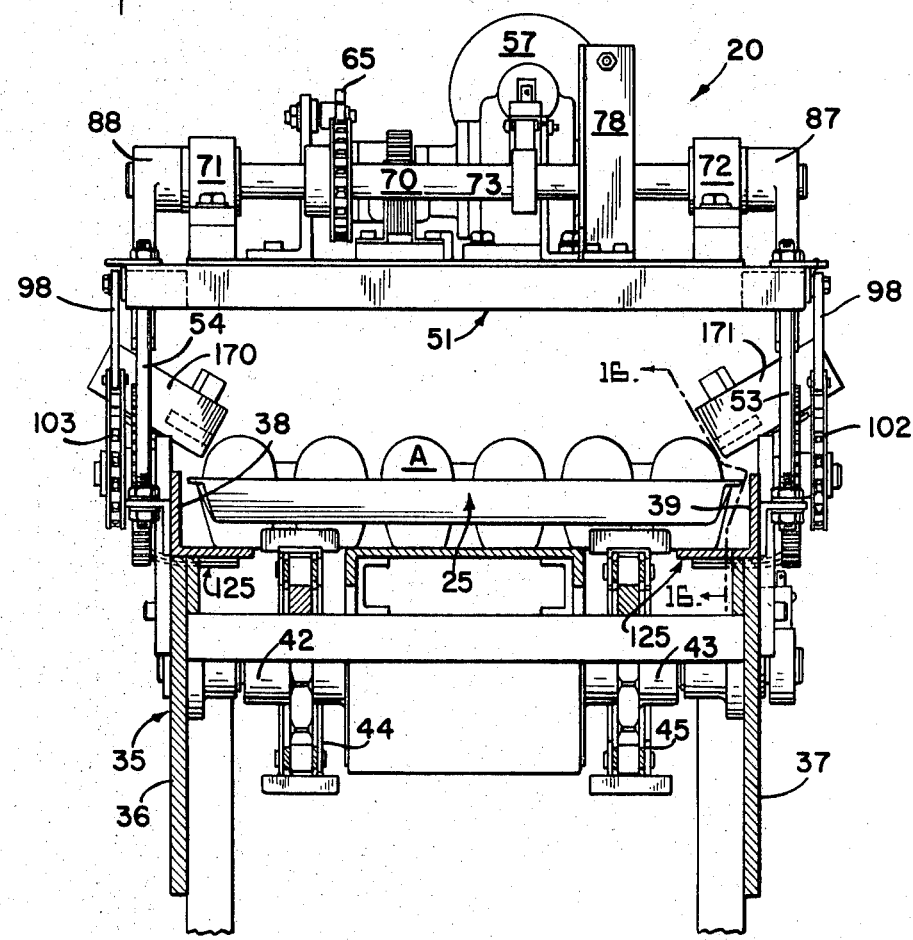
FIG. 3 is a sectional view taken generally along line 3—3 of FIG. 2, and illustrates a pair of the folding members positioned at opposite ends of and beneath a cover of a carton prior to the initiation of a folding cycle of the machine.

A link 98 is secured by a pivot pin 100 to each of the blocks 97, and an opposite ends of each of the links 98 is secured to a terminal link 101 of a pair of chains 102, 103 (FIGS. 1, 2 and 5). The chains 102, 103 are partially entrained about respective sprockets 104, 105 fixed to respective shafts 106, 107. Opposite ends (unnumbered) of the chains 102, 103 are connected to respective springs 108, 110 which are in turn connected to respective plates 111, 112 adjacent the respective bolts 55, 56. The function of the springs 108, 110 is to return the respective crank arms 87, 88 to their initial positions (FIG. 2) at the termination of a folding operation of the mechanism 50, as will be more apparent hereafter.

A pair of rotating elements or gears 114, 115 and 116, 117 are journalled for rotation in plates 118, 120. The plate 118 is secured to the plate 37 (FIG. 2) and to the two-piece angle bracket 39, while the plate 120 is similarly secured to the plate 36 and the two-piece (not shown) angle iron 39. The axes of the shafts 106, 107 are in alignment, as is best illustrated in FIG. 5 of the drawings, while shafts 121 122 to which the gears 115, 117 are fixed are similarly in alignment. The gears 116, 117 are also in mesh with each other, as are the gears 114, 115.

Each of the gears 114 through 117 carries folding means in the form of folding members or fingers each identically designated by the reference numeral 125. The folding members 125 are of a generally L-shaped configuration, and each includes a leg 126 and a terminal end portion 127. Each leg 126 is slidably received in a slot 128 (FIGS. 7 and 8) of its associated gear 114 through 117. Each slot 127 opens through the periphery (unnumbered) of its associated gear and is disposed with its longitudinal axis in chordal relationship to its associated gear. A bolt 130 passes through a slot 131 of each gear and through an opening 132 of each leg 126 of the folding members 125. A nut 134 when tightly threaded upon the bolt 130 fixedly secures each folding finger 125 with its terminal end portion 127 in any one of a variety of positions relative to the periphery of its associated gear, as indicated by the phantom outline positions in FIG. 7. The purpose for adjusting the folding fingers 125 is to adapt the closing machine 20 for closing cartons having covers of different widths, as will appear more fully hereafter.

OPERATING CYCLE

A closing cycle of the closing machine 20 is initiated upon the advancement of a carton beneath the plate 60 by the upper runs (unnumbered) of the chains 44, 45, as indicated by the left-to-right motion in FIG. 15 of the drawings. When properly positioned the carton 25 is disposed with its longitudinal center line midway between transversely opposing pairs of the folding members 125 as shown in FIG. 16 with the folding members 125 being disposed beneath an apertured plate (unnumbered) and in alignment for contact against top panels (unnumbered) of the covers 27, 28.

When the carton 25 is properly positioned a cam 140 (FIGS. 2 and 4) carried by the shaft 41 de-energizes a switch (not shown) which controls a motor for imparting movement to the conveyor chains 44, 45. This same cam 140 is part of a circuit 145 (FIG. 4) which through a cam follower 141 closes a switch 142. Assuming a main switch 143 is closed the motor 57 is continually energized over a circuit defined by the main switch 143, a conductor 144, the motor 57, a conductor 146, and a conductor 147. The motor 57 at this time is incapable of imparting motion to the drive chain 67 through the clutch 61 which remains de-activated by the engagement thereof with the finger 64. However, upon the depression of a switch 148, either manually or automatically, a relay 150 is energized over a circuit defined by the now closed main switch 143, a conductor 151, the now closed switch 148, a conductor 152, the now closed switch 142, a conductor 153, the coil of the relay 150, a conductor 154 and the conductor 147. Upon energizing the relay 150 a pair of switches 156, 157 are closed to energize the solenoid 63 and form a holding circuit therefor.

The closing of the switch 156 energizes the solenoid 163 over a circuit traced from the main switch 143, the conductor 144, a conductor 160, a conductor 161, the closed switch 156, the solenoid 163 and the conductor 147. The holding circuit for maintaining the finger 64 in its retracted position is traced from the conductor 147, the conductor 154, the solenoid 150, the closed switch 157, a conductor 162, the switch 75 which is closed upon the initial rotation of the cam shaft 70, the conductor 160, the conductor 144, and the main switch 143.

Upon the retraction of the finger 64 the continuously rotating motor 57 rotates the shaft 70 in a counterclockwise direction as viewed in FIGS. 2 and 5 of the drawings to similarly rotate each of the crank arms 87, 88 in a counter-clockwise direction from the "home" positions thereof illustrated in FIGS. 2 and 5. As the crank arms 87, 88 rotate counter-clockwise the chains 102, 103 are drawn upwardly and to the right, as indicated by phantom outline position A in FIG. 13. This movement causes clockwise rotation of the sprockets 105, 106 and the respective gears 114, 116 as viewed in FIG. 5 and counter-clockwise movement of the gears 115, 117 as viewed in this same figure. The folding members 125 carried by the gears 114 through 117 each moves in an arcuate path, such as the paths $P_1$, $P_2$ of FIG. 16, with the folding members 125 carried by the gears 114, 115 moving in opposite directions (clockwise and counter-clockwise respectively), and the folding members 125 of the gears 116, 117 similarly moving clockwise and counterclockwise as viewed in FIG. 5. The folding members 125 therefore each contacts an opposite end of the covers 127, 128 and begin the folding thereof about the respective hinge lines 30, 31 through the positions illustrated in FIGS. 17 through 22. In FIG. 22 the edges (unnumbered) of the covers 27, 28 are shown fully seated and locked within the slit 32 of one of the plurality of protuberances 33. At this position of the folding members 125 the crank arms 87, 88 have reached the over-center position B of FIG. 13 and begin to return, as at C, to the "home" position of FIG. 5 under the influence of the springs 108, 110. During this return movement the high side of the cam 85 of the shaft 70 begins urging the spring finger 81 (FIG. 14) of the brake 77 to the left placing a frictional drag upon the shaft 70 which immediately stops the shaft 70 and prevents the same from coasting upon the opening of the holding circuit as the follower 74 drops off the lobe of the cam 73 to open the switch 75. This deenergizes the solenoid 63 causing the disengagement of the clutch 61 upon the folding members 125 reaching the normal position thereof shown in FIG. 16.

The conveyor chains 44, 45 are again energized to move the upper runs thereof from left-to-right which causes the switch 142 to open under the influence of the cam 140, thereby conditioning the circuit 145 for re-energizing upon the movement of another carton to the folding mechanism 50.

During the movement of the now closed carton beyond the closing mechanism 50 opposite end panels thereof are printed upon by one or more printing means or rollers 170, 171. The rollers 170, 171 are secured by brackets 172, 173 to the frame 40, and the peripheries thereof are suitably contoured to print upon one or both of the end panels (unnumbered) of each of the covers 27, 28. At the completion of the printing operation the carton is deposited upon a conventional take-away conveyor 175 (FIG. 25) and transferred to a packaging and/or storing station.

Figure 6:
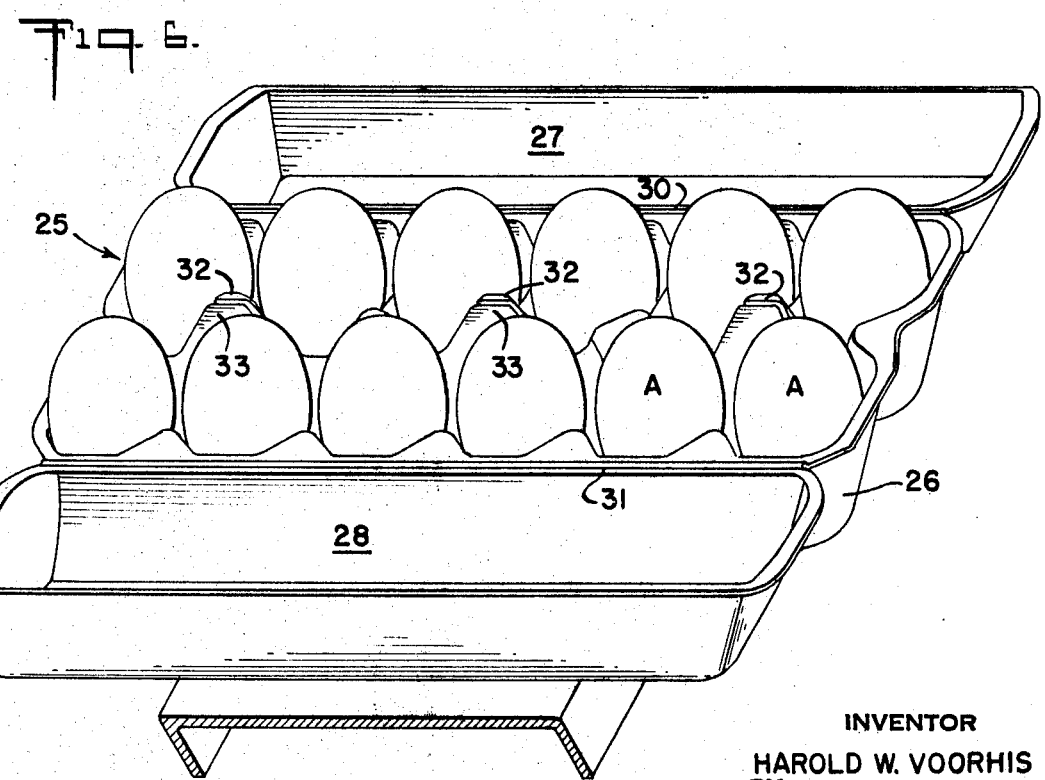
FIG. 6 is a perspective view of a carton of the type particularly adapted to be colsed by the machine of this invention, and illustrates a pair of covers joined to a carton body along generally parallel hinge lines, with the covers being illustrated in the open positions thereof.

While the closing machine 20 has been described in conjunction with closing cartons of the type illustrated in FIG. 6, it is to be understood that variations in the carton structure may be made and the closing mechanism 50 is equally adapted for closing such modified cartons. For example, if the overall width of the carton body 26 was greater or less than that illustrated in FIG. 6, along with the width of the covers 27, 28, the folding members 125 can be adjusted in the manner heretofore described relative to FIG. 7 by means of the bolt 130 and the nut 134 to adjust the folding members 125 as illustrated in phantom outline in this same figure. This will increase or decrease the radius of the paths $P_1$, $P_2$ to accommodate the closing mechanism 50 for closing wider and/or narrower covers. For example, if the folding members 125 of FIG. 16 are initially positioned a further distance radially outwardly from the periphery of the associated gears both the length of the paths $P_1$, $P_2$ and the radii thereof would be greater than shown in FIG. 16.

It should be also particularly noted that by adjusting the throw of the crank arms 87, 88 the length of the paths $P_1$, $P_2$ can be altered or varied without adjusting the folding members 125. For example, assuming that a carton of a greater height than that illustrated in the drawings is to be closed by the mechanism 50 the crank throw of each of the cranks 87, 88 is shortened by appropriately adjusting the screw 93. Upon so shortening the crank throw the dead center of each crank (position B of FIG. 13) is reached earlier than that heretofore described and the folding members of adjacent pairs of gears do not come as close to each other as compared to their positions prior to such adjustment. This reduction in the crank throw therefore terminates the folding movement of the folding members at a position higher than that illustrated in FIG. 22 whereupon the mechanism can be employed for closing cartons of an overall height greater than (as well as less than) the overall height of the carton 25.

While preferred forms and arrangement of parts have been shown in illustrating the invention, it is to be clearly understood that various changes in details and arrangement of parts may be made without departing from the spirit and scope of the invention as defined in the appended claimed subject matter.

I claim:

1. A machine for closing cartons of the type having a pair of covers each joined by a hinge line to opposite side walls of a body of the carton with the hinge lines being in generally parallel relationship to each other comprising means for conveying each carton along a predetermined path with the hinge lines generally normal thereto, a folding member normally positioned beneath and in alignment for contact with each end portion of each cover outboard of the hinge lines, means for moving each of the folding members about an axis generally normal to said predetermined path along paths from the normal position to a second position thereabove and more closely adjacent its associated hinge line whereby during the movement of the folding members the latter initially contact and progressively fold the covers about the hinge lines to a final poition in complete overlying relationship to the carton body, said folding members being arranged in pairs at opposite ends of the carton body, and the paths of movement of the folding members of each pair are in opposite senses to each other.

2. The machine as defined in claim 1 wherein the paths of movement of said folding members during the movement thereof are each of a generally curved configuration.

3. The machine as defined in claim 1 wherein the paths of movement of the folding members of each pair define mirror-image paths of each other.

4. The machine as defined in claim 1 wherein means are provided for adjusting the length of said paths for closing cartons of varying overall heights.

5. The machine as defined in claim 1 including means for advancing each closed carton toward a discharge end of the machine.

6. The machine as defined in claim 1 including means for adjusting the normal position of each folding member to vary the initial point of contact between each folding members and an associated cover for closing cartons having covers of varying widths.

7. The machine as defined in claim 1 wherein said moving means include a plurality of rotating elements, and a folding member is carried by each of said rotating elements.

8. The machine as defined in claim 1 wherin said moving means are a plurality of pairs of rotating elements, a folding member is carried by each of said rotating elements, and means coupling the rotating elements of each pair of rotating elements for rotary movement in opposite directions.

9. The machine as defined in claim 4 wherein said moving means includes a rotatable crank, and said adjusting means are effective for adjusting the length of crank throw to vary the length of said paths.

10. The machine as defined in claim 4 wherein said moving means are a plurality of pairs of rotating elements, a folding member is carried by each of said rotating elements, means coupling the rotating elements of each pair of rotating elements for rotary movement in opposite directions, a rotatable crank coupled to at least one of said rotating elements for imparting rotation thereto, and said adjusting means are effective for adjusting the length of crank throw to vary the length of said paths.

11. The machine as defined in claim 6 wherein said moving means include a plurality of rotating elements, a folding member is carried by each of said rotating elements with a terminal end portion of each folding member normally disposed beyond the periphery of its associated rotating element, and said adjusting means is effective for selectively varying the distance between each rotating element periphery and its associated folding member terminal end portion.

12. The machine as defined in claim 10 wherein a drive sprocket is connected to said one rotating element, said moving means further includes a chain at least partially entrained about said sprocket, means for normally drawing said chain in a direction tending to move said rotating elements and the folding members carried thereby toward said normal position, and said adjusting means are coupled between said chain and said rotatable crank.

13. A machine for closing cartons of the type having a pair of covers each joined by a hinge line to a body of the carton with the hinge lines being in generally parallel relationship to each other comprising a folding member normally positioned beneath and in alignment for contact with each end portion of each cover outboard of the hinge lines, said folding members being disposed in pairs at opposite ends of the carton, each folding member being carried by a rotating element, and means for simultaneously rotating both pairs of said rotating elements and the folding members carried thereby in opposite directions whereby each folding member is moved along an arcuate path from the normal position thereof to a second position above and more closely inboard its associated hinge line whereby said folding members each initially contacts and progressively folds the covers about the hinge lines to a final position in complete overlying relationship to the carton body.

14. The machine as defined in claim 13 wherein said rotating elements have axes disposed in parallel relationship to each other and to the carton hinge lines.

15. The machine as defined in claim 14 wherein each pair of rotating elements is in meshed relationship whereby rotation in a first direction imparted to each of one element of each pair of elements is imparted to the remaining element of each pair of a direction opposite said first direction.

16. The machine as defined in claim 15 including means for oscillatingly rotating each of said one elements.

17. The machine as defined in claim 15 including a pair of rotary crank arms, means coupling each crank arm to said one element of each pair of rotating elements, and means for adjusting the crank throw of each crank arm to vary the length of the paths for closing cartons of varying overall heights.

18. The machine as defined in claim 15 wherein each folding member has a terminal end portion normally disposed radially beyond the periphery of its associated rotating element, and means are provided for selectively varying the radial distance between each rotating element periphery and its associated folding member terminal end portion to vary the initial point of contact between each folding member and an associated cover for closing cartons having covers of varying widths.

19. The machine as defined in claim 1 wherin said moving means include first means for moving one folding member of each pair of folding members in unison, and means for synchronizing the movement of each one folding member with the movement of the other folding member of each pair.

20. The machine as defined in claim 19 wherein said first means is disposed transverse to said predetermined path, and said synchronizing means is disposed at opposite sides of said predetermined path.

21. The machine as defined in claim 20 wherein each folding member is carried by a rotating element, and said synchronizing means is defined by meshed gear means between each pair of rotating elements.

22. The machine as defined in claim 1 wherein said moving means include a plurality of rotating elements, a folding member being carried by each of said rotating elements with a terminal end portion of each folding member normally disposed beyond the periphery of its associated rotating element, and means for adjusting the distance between each terminal end portion and its associated rotating element periphery for selectively varying the distance therebetween to accommodate cartons having covers of different sizes.

23. The machine as defined in claim 1 wherein each folding member is carried by a rotatable element, the rotatable elements of adjacent pairs being in meshed relationship, one rotatable element of each pair having a shaft, and said moving means including crank arm means operably coupled to each of said shafts, and means for imparting rotation to said crank arm means whereby rotation of the latter is transmitted to said rotatable elements to move the folding members of each pair in opposite senses to each other.

References Cited

UNITED STATES PATENTS

| | | | |
|---|---|---|---|
| 3,039,370 | 6/1962 | King et al. | 53—374X |
| 3,447,282 | 6/1969 | Mumma | 53—376X |

H. A. KILBY, JR., Primary Examiner